US012149028B2

(12) United States Patent
Nam et al.

(10) Patent No.: US 12,149,028 B2
(45) Date of Patent: Nov. 19, 2024

(54) CONNECTOR ASSEMBLY

(71) Applicants: Hyundai Motor Company, Seoul (KR); Kia Corporation, Seoul (KR); Tyco Electronics AMP Korea Co., Ltd., Gyeongsan-si (KR)

(72) Inventors: Bum Woo Nam, Incheon (KR); Kun Teak Lim, Gyeongsan-Si (KR); Chang Ho Lee, Gyeongsan-Si (KR); Ki Ho Choi, Daegu (KR)

(73) Assignees: Hyundai Motor Company, Seoul (KR); Kia Corporation, Seoul (KR); Tyco Electronics AMP Korea Co., Ltd., Gyeongsan-si (KR)

( * ) Notice: Subject to any disclaimer, the term of this patent is extended or adjusted under 35 U.S.C. 154(b) by 357 days.

(21) Appl. No.: 17/736,864

(22) Filed: May 4, 2022

(65) Prior Publication Data

US 2022/0399684 A1 Dec. 15, 2022

(30) Foreign Application Priority Data

Jun. 11, 2021 (KR) ........................ 10-2021-0076134

(51) Int. Cl.

| | |
|---|---|
| ***H01R 13/641*** | (2006.01) |
| ***H01R 13/502*** | (2006.01) |
| ***H01R 13/627*** | (2006.01) |
| ***H01R 13/639*** | (2006.01) |

(52) U.S. Cl.
CPC ......... *H01R 13/641* (2013.01); *H01R 13/502* (2013.01); *H01R 13/6271* (2013.01); *H01R 13/639* (2013.01)

(58) Field of Classification Search
CPC ................ H01R 13/641; H01R 13/502; H01R 13/6271; H01R 13/639
See application file for complete search history.

(56) References Cited

U.S. PATENT DOCUMENTS

| | | | | |
|---|---|---|---|---|
| 5,174,786 A * | 12/1992 | Kato | .................... | H01R 13/641 439/352 |
| 9,608,369 B1 | 3/2017 | Brandt et al. | | |
| 9,831,601 B2 | 11/2017 | Kim | | |
| 11,217,946 B2 * | 1/2022 | Nawa | ................. | H01R 13/7032 |

FOREIGN PATENT DOCUMENTS

| | | |
|---|---|---|
| KR | 10-2010-0064995 | 6/2010 |
| KR | 10-1998077 | 7/2019 |

* cited by examiner

*Primary Examiner* — Renee S Luebke
*Assistant Examiner* — Paul D Baillargeon
(74) *Attorney, Agent, or Firm* — Morgan, Lewis & Bockius LLP

(57) ABSTRACT

Introduced is a connector assembly in which a CPA member, which assists in fastening a first connector and a second connector, securely connects the first connector and the second connector, and prevents a short circuit of an electrical signal, may be automatically inserted.

12 Claims, 4 Drawing Sheets

CONNECTOR ASSEMBLY

CROSS REFERENCE TO RELATED APPLICATION

The present application claims priority to Korean Patent Application No. 10-2021-0076134, filed Jun. 11, 2021, the entire contents of which is incorporated herein for all purposes by this reference.

BACKGROUND OF THE INVENTION

Field of the Invention

The present invention relates to a connector assembly, and more particularly, to a connector assembly including a connector position assurance (CPA) member which is automatically inserted.

Description of Related Art

Connectors refer to devices for connecting components so that the components may transmit electricity in various technical fields including vehicles. The connectors securely maintain not only the electrical connection between the components but also the physical connection between the components to continuously maintain the electrical connection.

The connectors include a female connector and a male connector connected to the female connector and further include a fixing member (CPA member) that prevents the female connector and the male connector from being uncoupled.

Because the CPA member is additionally applied to check whether the female connector and the male connector are coupled after the female connector and the male connector are coupled, an operator frequently cannot perfectly couple the CPA member in some instances, which causes a problem in that the connector cannot operate due to a loss of an ability to transmit electricity or malfunction may occur.

If elasticity of an elastic member, which is required to couple the CPA member, is decreased to make it easy to couple the CPA member, the female connector and the male connector may be instantaneously short-circuited due to instantaneous vibration, which may also cause malfunction.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a connector assembly including: a first connector having a catching protrusion protruding from an external circumferential surface thereof; a second connector configured to be fastened to the first connector and having a fixing plug provided in an internal space thereof, the second connector being configured so that when the second connector is fastened to the first connector, the fixing plug moves toward the catching protrusion and climbs over the catching protrusion to prevent the second connector from being separated from the first connector; and a CPA member provided in the second connector, configured to be fastened to the first connector together with the second connector, and having a fixing cap extending from an end portion of the CPA member, the CPA member being configured so that when the first connector and the second connector are fastened to each other, the fixing cap moves toward the catching protrusion and climbs over the catching protrusion and the fixing plug to prevent the first connector and the second connector from being separated from each other.

In other to achieve the above-mentioned object, a connector assembly according to various exemplary embodiments of the present invention may include a first connector having a catching protrusion protruding from an external circumferential surface thereof; a second connector configured to be fastened to the first connector and having a fixing plug provided in an internal space thereof, the second connector being configured so that when the second connector is fastened to the first connector, the fixing plug moves toward the catching protrusion and climbs over the catching protrusion to prevent the second connector from being separated from the first connector; and a CPA member provided in the second connector, configured to be fastened to the first connector together with the second connector, and having a fixing cap extending from an end portion of the CPA member, the CPA member being configured so that when the first connector and the second connector are fastened to each other, the fixing cap moves toward the catching protrusion and climbs over the catching protrusion and the fixing plug to prevent the first connector and the second connector from being separated from each other.

The catching protrusions may be formed on upper and lower surfaces of the external circumferential surface of the first connector.

An elastic member may be inserted into an elastic member insertion protrusion provided between the second connector and the CPA member.

The CPA member may be assembled with the second connector while pressing the elastic member.

Before the first connector and the second connector are fastened, the fixing cap of the CPA member may engage with the fixing plug of the second connector such that the elastic member may be kept pressed by the CPA member.

When the first connector and the second connector are fastened, the elastic member may be released from the CPA member after the fixing plug climbs over the catching protrusion, the elastic member may extend and push the CPA member, the fixing cap may climb over the catching protrusion and the fixing plug to prevent the first connector and the second connector from being separated from each other.

A stop protrusion may be provided on an upper surface of the CPA member and inclined upward, a restriction protrusion may be provided on the second connector to restrict a motion of the CPA member, and the stop protrusion and the restriction protrusion may engage with each other to restrict the motion of the CPA member toward the first connector when the first connector and the second connector are fastened.

A first inclined surface having an inclination may be formed on the external circumferential surface of the first connector and disposed in front of the catching protrusion, and a second inclined surface may be formed at an end portion of the fixing plug.

The second inclined surface may have an inclination angle corresponding to the first inclined surface.

An end portion of the fixing cap may extend and be bent downward, and the end portion bent downward may be bent forward again to define a third inclined surface.

The third inclined surface may have an inclination angle corresponding to the second inclined surface.

The first connector may have an insertion space into which the second connector is inserted, and an insertion portion of the second connector may be inserted into the insertion space of the first connector such that the first connector and the second connector may be fastened.

The insertion portion may include Terminal position assurance (TPA).

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
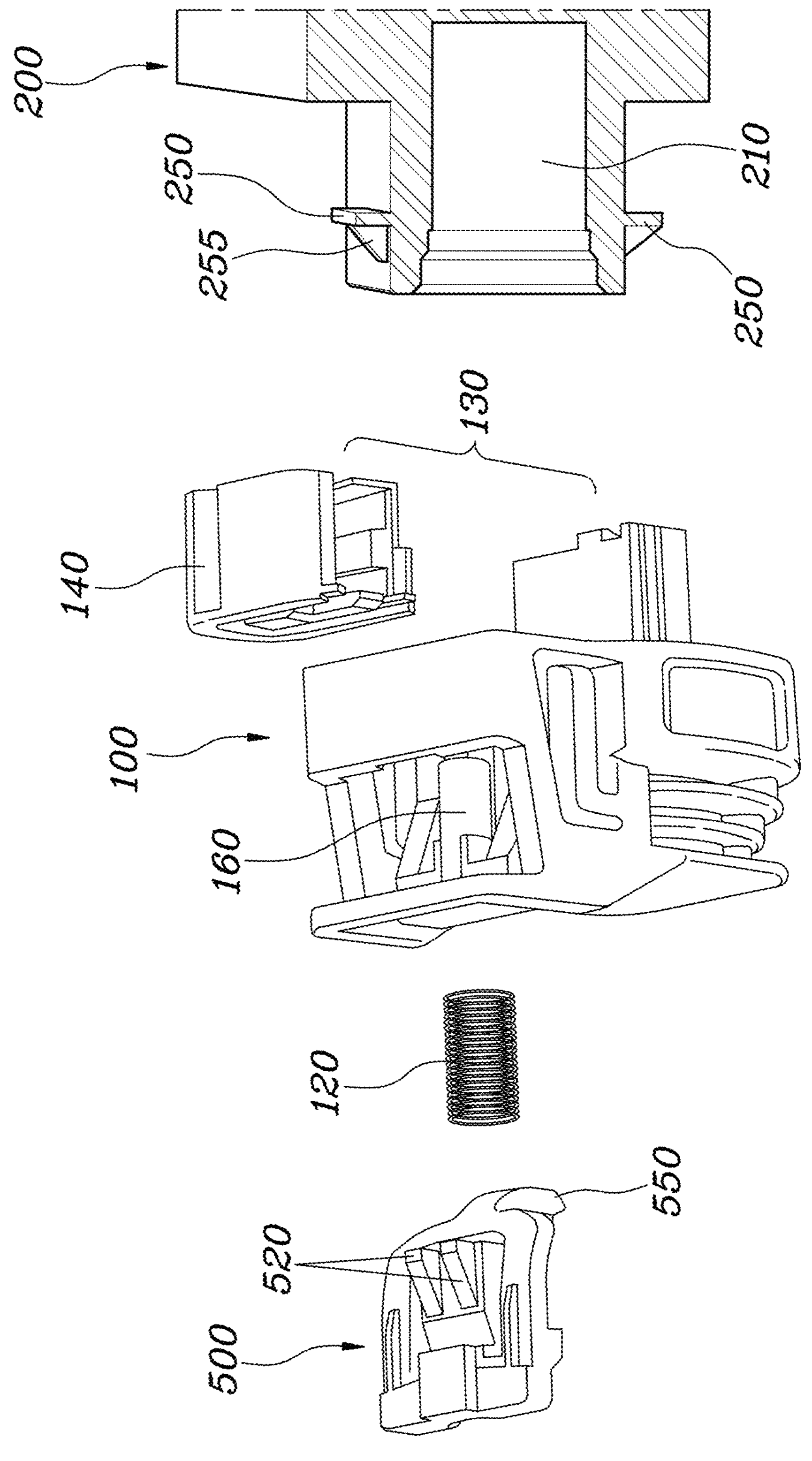
FIG. 1 is an exploded view of a connector assembly according to various exemplary embodiments of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, specific contents for solving the above-mentioned problems and achieving the above-mentioned object will be described below in detail with reference to the accompanying drawings. Meanwhile, the detailed description of publicly-known related technologies in the same field will be omitted when it is determined that the detailed description is not helpful in understanding the subject matter of the present invention. The technical spirit of the present invention is not limited thereto and may be variously modified and conducted by those skilled in the art.

Figure 2A:
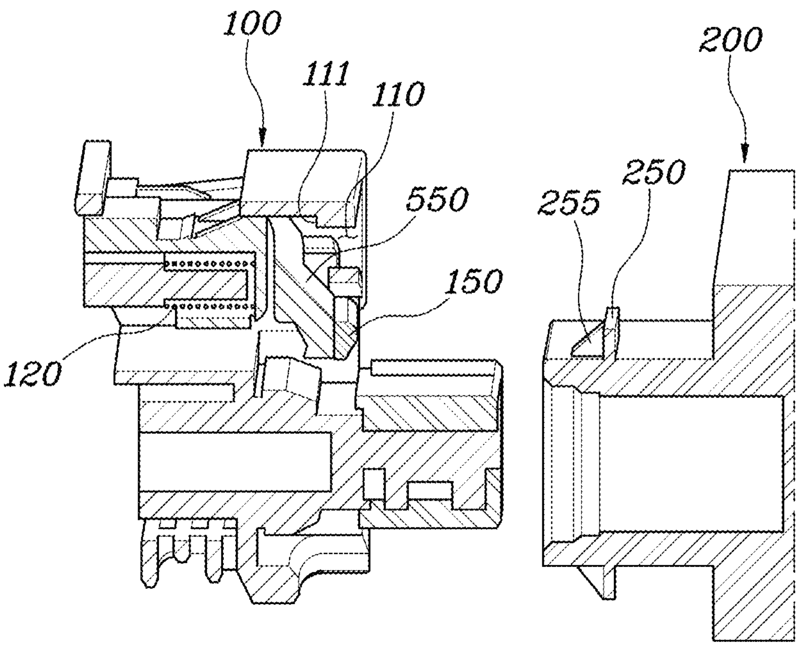
FIG. 2A is a view exemplarily illustrating cross-sections showing states before a first connector and a second connector of the connector assembly according to the exemplary embodiment of the present invention are coupled and FIG. 2B is a view exemplarily illustrating cross-sections showing states after a first connector and a second connector of the connector assembly according to the exemplary embodiment of the present invention are coupled.
Figure 2B:
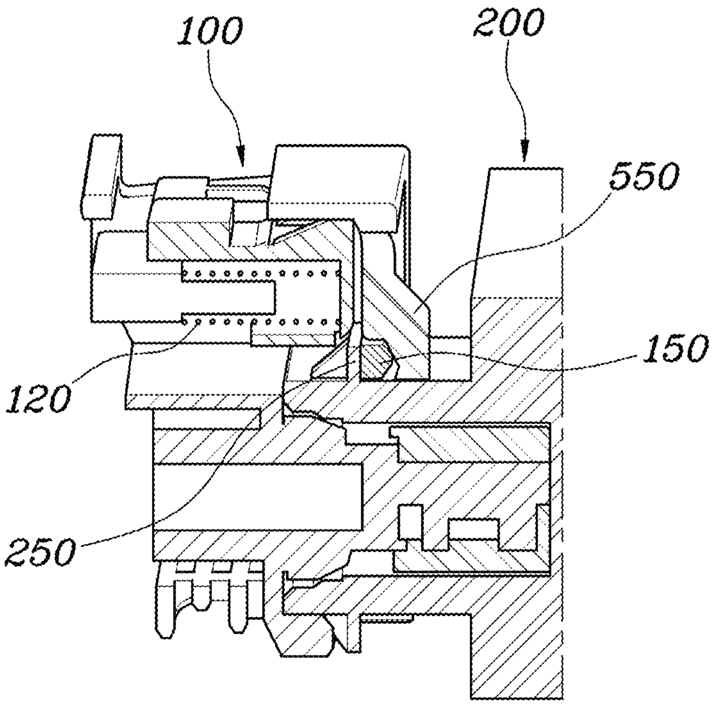
Figure 3A:
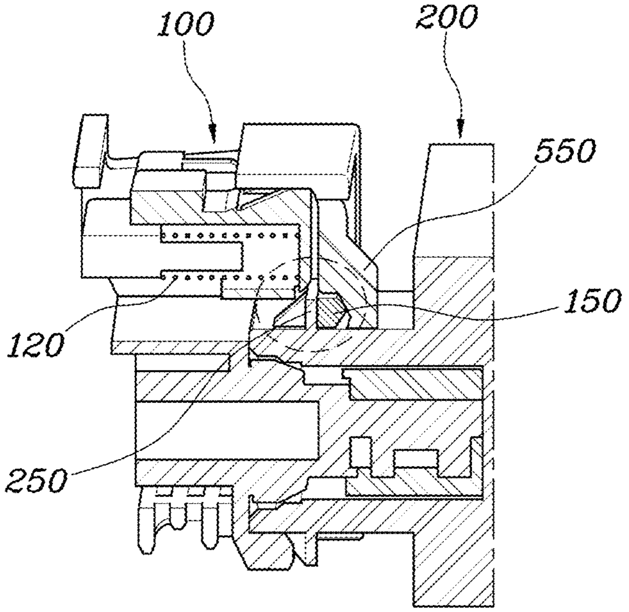
FIG. 3A is a view exemplarily illustrating cross-sections showing states after a first connector and a second connector of the connector assembly according to the exemplary embodiment of the present invention are coupled.
Figure 3B:
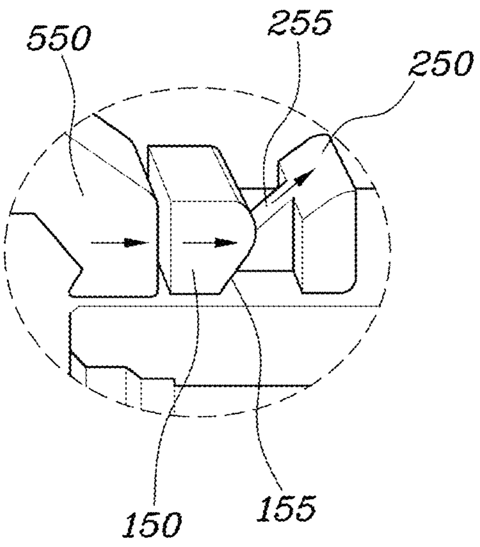
FIG. 3B is a view exemplarily illustrating motions of a fixing plug and a fixing cap of the connector assembly according to the exemplary embodiment of the present invention.
Figure 3C:
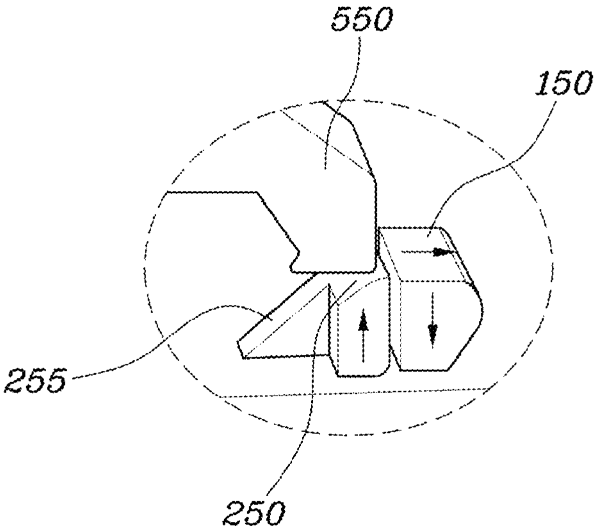
FIG. 3C is a view exemplarily illustrating motions of a fixing plug and a fixing cap of the connector assembly according to the exemplary embodiment of the present invention.
Figure 4A:
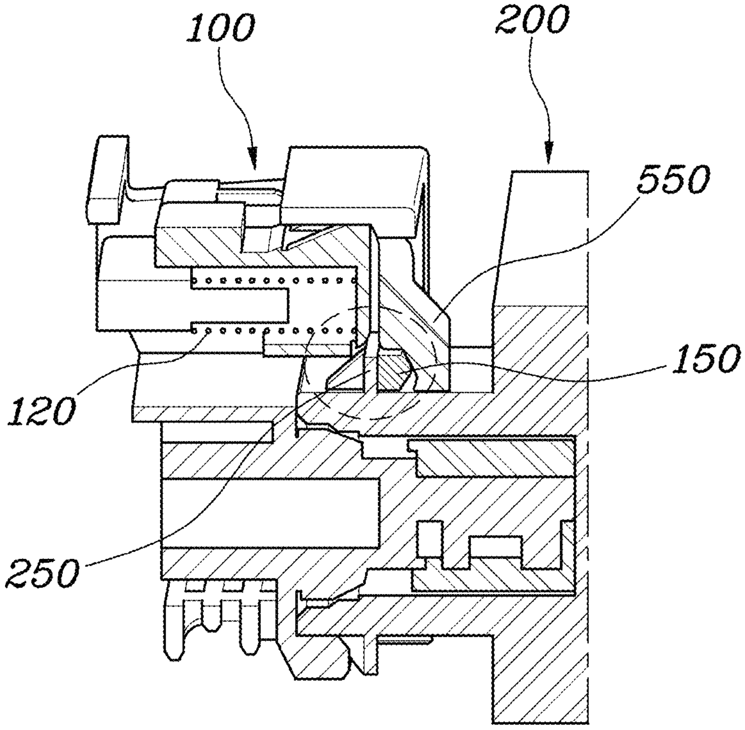
FIG. 4A is a view exemplarily illustrating cross-sections showing states after a first connector and a second connector of the connector assembly according to the exemplary embodiment of the present invention are coupled.
Figure 4B:
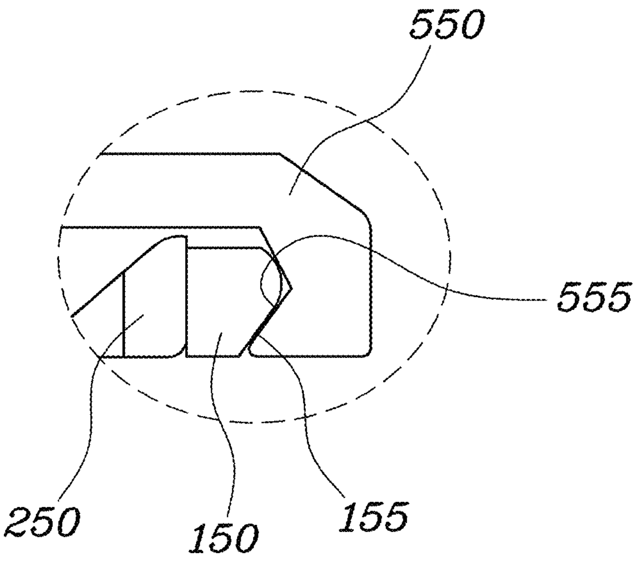
FIG. 4B is a view exemplarily illustrating fixing plug, catching protrusion and fixing cap after a first connector and a second connector of the connector assembly according to the exemplary embodiment of the present invention are coupled.

FIG. 1 is an exploded view of a connector assembly according to various exemplary embodiments of the present invention, FIG. 2A is a view exemplarily illustrating cross-sections showing states before a first connector and a second connector of the connector assembly according to the exemplary embodiment of the present invention are coupled, and FIG. 2B is a view exemplarily illustrating cross-sections showing states after a first connector and a second connector of the connector assembly according to the exemplary embodiment of the present invention are coupled. FIG. 3A is a view exemplarily illustrating cross-sections showing states after a first connector and a second connector of the connector assembly according to the exemplary embodiment of the present invention are coupled, FIG. 3B is a view exemplarily illustrating motions of a fixing plug and a fixing cap of the connector assembly according to the exemplary embodiment of the present invention, and FIG. 3C is a view exemplarily illustrating motions of a fixing plug and a fixing cap of the connector assembly according to the exemplary embodiment of the present invention. FIG. 4A is a view exemplarily illustrating cross-sections showing states after a first connector and a second connector of the connector assembly according to the exemplary embodiment of the present invention are coupled, and FIG. 4B is a view exemplarily illustrating fixing plug, catching protrusion and fixing cap after a first connector and a second connector of the connector assembly according to the exemplary embodiment of the present invention are coupled.

To achieve the above-mentioned object, a connector assembly according to various exemplary embodiments of the present invention may include a first connector 200 having a catching protrusion 250 protruding from an external circumferential surface thereof; a second connector 100 configured to be fastened to the first connector 200 and having a fixing plug 150 provided in an internal space 110 thereof, the second connector 100 being configured so that when the second connector 100 is fastened to the first connector 200, the fixing plug 150 moves toward the catching protrusion 250 and climbs over the catching protrusion 250 to prevent the second connector 100 from being separated from the first connector 200; and a CPA member 500 provided in the second connector 100, configured to be fastened to the first connector 200 together with the second connector 100, and having a fixing cap 550 extending from an end portion thereof, the CPA member 500 being configured so that when the first connector 200 and the second connector 100 are fastened to each other, the fixing cap 550 moves toward the catching protrusion 250 and climbs over the catching protrusion 250 and the fixing plug 150 to prevent the first connector 200 and the second connector 100 from being separated from each other.

Referring to FIG. 1, FIGS. 2A, 2B, 3A, 3B and 3C, the first connector 200 is configured as a female connector for accommodating the second connector 100, and the second connector 100 is configured as a male connector inserted into the first connector 200. The first connector 200 has an insertion space 210 into which the second connector 100 is inserted. An insertion portion 130 of the second connector 100 is inserted into the insertion space 210 of the first connector 200 such that the first connector 200 and the second connector 100 may be fastened to each other. In the instant case, Terminal position assurance (TPA) 140 may be further assembled with the insertion portion 130. The TPA 140 is configured to prevent a terminal, which transmits electric current to the connector, from being separated from the connector assembly. The TPA 140 is also called DBL (double locking). The TPA 140 may be mounted with the insertion portion 130 by sliding.

The CPA member 500 refers to a member configured to securely couple the first connector 200 and the second connector 100, preventing the electrical connection. Generally, because a spring needs to be pressed to fasten and assemble the connector of the connector assembly, a large number of processes is required to fasten the connector using the CPA member. For the present reason, an operator frequently cannot insert the CPA member at one time.

To solve the present problem, the CPA member 500 provided in the second connector 100 automatically moves forward at the same time when the first connector 200 and the second connector 100 are fastened to each other. The fixing cap 550 sequentially passes over the catching protrusion 250 and the fixing plug 150, securely fastening the first connector 200 and the second connector 100.

The catching protrusion 250 formed on the external circumferential surface of the first connector 200 and the fixing plug 150 formed in the internal space 110 of the second connector 100 are configured to fasten the first connector 200 and the second connector 100 as the fixing plug 150 climbs over the catching protrusion 250 and crosses the catching protrusion 250 when the first connector 200 and the second connector 100 are fastened to each other. In the instant case, the catching protrusions 250 may be formed on upper and lower surfaces of the external circumferential surface of the first connector 200, so that the second connector 100 may be coupled in a state inverted to the state illustrated in FIGS. 2A and 2B. In some instances, the second connector 100 may be inserted to the first connector 200 in a forward direction or an inverted direction thereof.

Meanwhile, an elastic member insertion protrusion 160 may be provided between the second connector 100 and the CPA member 500, and an elastic member 120 may be inserted into the elastic member insertion protrusion 160. The elastic member 120 is configured to push the CPA member 500 toward the first connector. The elastic member 120 is inserted into the elastic member insertion protrusion 160 before the CPA member 500 is assembled with the second connector 100. Thereafter, the CPA member 500 may be inserted into and assembled with the second connector while pressing the elastic member 120.

The connector assembly is completed as the second connector 100 assembled with the CPA member 500 is fastened to the first connector 200.

Meanwhile, referring to FIGS. 2A and 2B, before the first connector 200 and the second connector 100 are fastened to each other, the fixing cap 550 of the CPA member 500 is assembled by engaging with the fixing plug 150 of the second connector 100 such that the elastic member 120 may be kept pressed by the CPA member 500. That is, since the fixing plug 150 fixes the fixing cap 550 to prevent the CPA member 500 from moving, the elastic member 120 is kept pressed by the CPA member 500 until the fixing plug 150 releases the fixing cap 550.

Referring to FIGS. 3A, 3B and 3C, the fixing plug 150 climbs over the catching protrusion 250 when the first connector 200 and the second connector 100 are fastened to each other. Thereafter, when the elastic member 120 is released from the CPA member 500, the elastic member 120 extends and pushes the CPA member 500 such that the fixing cap 550 climbs over the catching protrusion 250 and the fixing plug 150, preventing the first connector 200 and the second connector 100 from being separated. Since the fixing plug 150 and the fixing cap 550 need to climb over the catching protrusion by being deformed, the fixing plug 150 and the fixing cap 550 may have rigidity at a predetermined level or higher and may be made of an easily deformable material.

Meanwhile, referring to FIG. 1, stop protrusions 520 are formed on an upper surface of the CPA member 500 and inclined upwards. Referring to FIGS. 2A and 2B, the second connector has a restriction protrusion 111 that restricts the motion of the CPA member. Therefore, when the first connector 200 and the second connector 100 are fastened, the stop protrusion 520 may engage with the restriction protrusion 111, restricting the motion of the CPA member 500 toward the first connector 200.

That is, the CPA member 500 is moved toward the first connector 200 by being pressed by the elastic member 120 when the first connector 200 and the second connector 100 are fastened. Therefore, the fixing cap 550 needs to be controlled to accurately engage with a rear end portion of the fixing plug 150 to securely fasten the first connector 200 and the second connector 100. Therefore, it is necessary to control the motion of the CPA member 500. The restriction protrusion 111 of the CPA member 500 and the stop protrusion 520 of the second connector are configured to control the motion of the CPA member 500. The position of the stop protrusion 520 and the position of the restriction protrusion 111 may be set such that the stop protrusion 520 may engage with the restriction protrusion 111 after the fixing cap 550 climbs over the catching protrusion 250 and the fixing plug 150 and engages with the fixing plug 150.

Meanwhile, a first inclined surface 255 having an inclination may be formed in front of the catching protrusion 250 and disposed on the external circumferential surface of the first connector, and a second inclined surface 155 may be formed at an end portion of the fixing plug 150.

Referring to FIGS. 2A, 2B, 3A, 3B and 3C, the first inclined surface 255 may be formed on the external circumferential surface of the first connector and disposed in front of the catching protrusion 250 so that the fixing plug 150 of the second connector 100 and the fixing cap 550 of the CPA member 500 may smoothly climb over the catching protrusion 250. If the first inclined surface is not formed, the degree of deformation of the fixing plug 150 and the fixing cap 550 is rapidly increased when the fixing plug 150 and the fixing cap 550 pass over the catching protrusion. Therefore, the fixing plug 150 and the fixing cap 550 need to be made of a material having high rigidity. i.e., higher than a predetermined rigidity because there is a risk that the fixing plug 150 or the fixing cap 550 is broken during the fastening process. However, in the case in which the first inclined surface 255 is formed, the degree of deformation of the fixing plug 150 and the fixing cap 550 is slowly increased while the fixing plug 150 and the fixing cap 550 pass over the first inclined surface 255 and the catching protrusion 250. Therefore, the fixing plug 150 and the fixing cap 550 may be made of a material having relatively low rigidity. i.e., lower than a predetermined rigidity.

The fixing plug 150 may also have an inclined surface. The second inclined surface 155 formed at the end portion of the fixing plug 150 comes into contact with the first inclined surface 255 to allow the fixing plug 150 to be positioned on an upper portion of the catching protrusion 250. Thereafter, the fixing plug 150 moves downwardly from the catching protrusion 250 so that the catching protrusion 250 and the fixing plug 150 cross each other. In the instant case, the second inclined surface 155 may have an inclination angle corresponding to the first inclined surface 255 so that the fixing plug 150 may more smoothly pass over the inclined surface.

Meanwhile, referring to FIGS. 4A and 4B, an end portion of the fixing cap 550 of the CPA member 500 may extend and be bent downward, and the end portion bent downward may extend and be bent forward again, defining a third inclined surface 555. The third inclined surface 555 engages with the second inclined surface 155 of the fixing plug 150 to prevent the fixing cap 550 from being withdrawn from the fixing plug 150. The third inclined surface 555 may have an inclination angle corresponding to the second inclined surface 155.

In various exemplary embodiments of the present invention, the fixing cap 550 may secondarily assist in fastening the first connector 200 and the second connector 100, and the second inclined surface 155 formed on the fixing plug 150 and the third inclined surface 555 formed on the fixing cap 550 may tertiarily assist in fastening the first connector 200 and the second connector 100, securely fastening the first connector 200 and the second connector 100.

With the above-mentioned configuration, the connector assembly according to various exemplary embodiments of the present invention may make it easy to insert the CPA member and securely fasten the first connector and the second connector.

While the specific embodiments of the present invention have been illustrated and described, it will be obvious to those skilled in the art that the present invention may be variously modified and changed without departing from the technical spirit of the present invention defined in the appended claims.

According to the connector assembly according to various exemplary embodiments of the present invention, when the first connector and the second connector are fastened, the CPA member provided in the second connector automatically moves rearward thereof, and the fixing cap provided on the CPA member may more securely couple the first connector and the second connector. In the instant case, because the CPA member continuously receive an elastic force from the elastic member, the secure coupling between the first connector and the second connector may be continuously maintained unless the first connector and the second connector are separated artificially.

Furthermore, when the first connector and the second connector are fastened, the fixing cap is released from the fixing plug, and the elastic member presses the CPA member such that the fixing cap of the CPA member automatically engages with the rear end portion of the fixing plug, which makes it easy to connect the connectors.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents

What is claimed is:

1. A connector assembly comprising:

a first connector having a catching protrusion protruding from an external circumferential surface thereof;

a second connector configured to be fastened to the first connector and having a fixing plug provided in an internal space thereof, wherein when the second connector is fastened to the first connector, the fixing plug moves toward the catching protrusion and climbs over the catching protrusion to prevent the second connector from being separated from the first connector; and a connector position assurance (CPA) member provided in the second connector, configured to be fastened to the first connector together with the second connector, and having a fixing cap extending from an end portion of the CPA member, wherein when the first connector and the second connector are fastened to each other, the fixing cap moves toward the catching protrusion and climbs over the catching protrusion and the fixing plug to prevent the first connector and the second connector from being separated from each other, wherein an elastic member is inserted into an elastic member insertion protrusion provided between the second connector and the CPA member, wherein the CPA member is mounted with the second connector while pressing the elastic member, and wherein before the first connector and the second connector are fastened, the fixing cap of the CPA member engages with the fixing plug of the second connector so that the elastic member is kept pressed by the CPA member.

2. The connector assembly of claim 1, wherein the catching protrusion is formed on at least one of upper and lower surfaces of the external circumferential surface of the first connector.

3. The connector assembly of claim 1, wherein when the first connector and the second connector are fastened, the elastic member is released from the CPA member after the fixing plug climbs over the catching protrusion, the elastic member extends and pushes the CPA member, the fixing cap climbs over the catching protrusion and the fixing plug to prevent the first connector and the second connector from being separated from each other.

4. The connector assembly of claim 1, wherein a stop protrusion is provided on an upper surface of the CPA member and inclined upward, and a restriction protrusion is provided on the second connector to restrict a motion of the CPA member, and wherein the stop protrusion and the restriction protrusion engage with each other to restrict the motion of the CPA member toward the first connector when the first connector and the second connector are fastened.

5. The connector assembly of claim 1, wherein a first inclined surface having an inclination is formed on the external circumferential surface of the first connector and disposed in front of the catching protrusion, and a second inclined surface is formed at an end portion of the fixing plug.

6. The connector assembly of claim 5, wherein the second inclined surface has an inclination angle corresponding to the first inclined surface.

7. The connector assembly of claim 5, wherein an end portion of the fixing cap extends and is bent downward, and the end portion bent downward extends and is bent forward again to define a third inclined surface.

8. The connector assembly of claim 7, wherein the third inclined surface engages with the second inclined surface of the fixing plug to prevent the fixing cap from being withdrawn from the fixing plug.

9. The connector assembly of claim 8, wherein the third inclined surface has an inclination angle corresponding to the second inclined surface.

10. The connector assembly of claim 1, wherein the first connector has an insertion space into which the second connector is inserted, and an insertion portion of the second connector is inserted into the insertion space of the first connector so that the first connector and the second connector are fastened.

11. The connector assembly of claim 10, wherein the insertion portion includes Terminal Position Assurance (TPA).

12. The connector assembly of claim 11, wherein the TPA is mounted with the insertion portion by sliding.

* * * * *